(No Model.)

C. H. F. KRAFT.
FISHING REEL.

No. 581,291. Patented Apr. 27, 1897.

Witnesses
Henry G. M. Howard.
Levi F. Cox

Inventor
Charles H. F. Kraft.
By his Attorney Lucius C. West.

UNITED STATES PATENT OFFICE.

CHARLES H. F. KRAFT, OF BATTLE CREEK, MICHIGAN.

FISHING-REEL.

SPECIFICATION forming part of Letters Patent No. 581,291, dated April 27, 1897.

Application filed April 9, 1896. Serial No. 586,792. (No model.)

*To all whom it may concern:*

Be it known that I, CHARLES H. F. KRAFT, a citizen of the United States, residing at Battle Creek, in the county of Calhoun, State of Michigan, have invented a new and useful Fishing-Reel, of which the following is a specification.

The object of this invention is to provide a fishing-reel with an improved brake to govern the speed of the reel when unreeling the line to prevent the line from becoming tangled by backlash when the line stops unreeling, for by means of my brake I can set just such a tension on the reel as desired, and then there is no danger of the reel getting under too great momentum.

Figure 3:
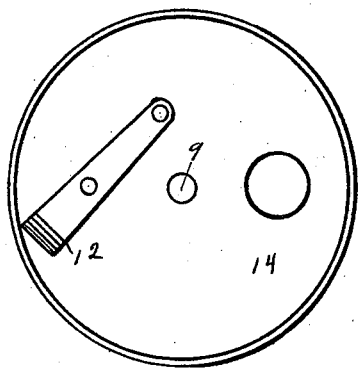
Figure 2:
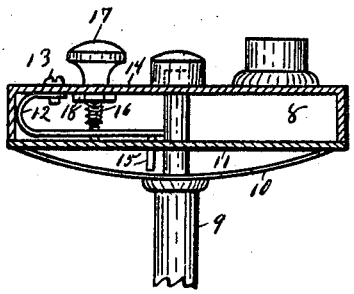
Figure 4:
Figure 5:
Figure 1:
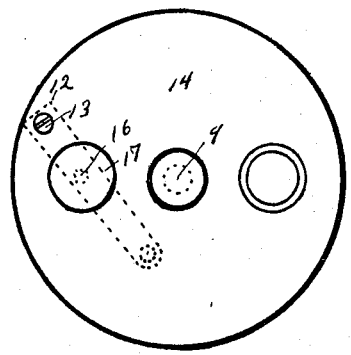
Figure 6:
Figure 7:
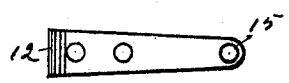

In the drawings forming a part of this specification, Figure 1 is a plan of Fig. 2, the spring-brake being shown in dotted lines; Fig. 2, a section on line *a a* in Fig. 1, looking from a point below; Fig. 3, an inverted view of Fig. 2; Fig. 4, a side elevation of the screw with which the brake is operated; Fig. 5, a plan of the nut on said screw in Fig. 2; Fig. 6, an edge view of the brake; and Fig. 7 is a view of Fig. 6, looking from a point below.

Referring to the parts of the drawings pointed out by numerals, 8 is a hollow case at one end of the reel and in which one end of the reel 9 has bearings, the other end of the reel being broken away. The reel has a head 10, which turns with it and fits loosely against the wall 11 of the case and is convexed on the face next to said wall, Fig. 3.

Within the case 8 is a spring having one end curved, as at 12, which end is attached at 13 to the inner face of the wall 14, and the other end of said spring being provided with a projection 15, which passes loosely through the wall 11 in position to engage the inner face of the head 10 when pressed upon, and thus constitute a brake to the reel.

The spring-brake is operated by a screw 16, which is provided with a head 17 on the outside of the case 8 and passes through the wall 14, being held in a swiveled manner therein by nut 18, and the inner end of the screw is screw-threaded and screws into the spring. Thus by turning the screw one way or the other the brake projection is caused to have the desired tension on the reel. The screw being in a convenient position it can be nicely and accurately and quickly adjusted by rolling between the thumb and finger while attending to other duties. The brake thus constructed is very simple and yet firm and cannot get out of order, and it can be very cheaply produced. It can be attached even to reels already made. Of course the brake could be set sufficiently tight to form a stop to the movement of the reel, but its chief merit is in its variable and nice adjustment of the brake tension.

Having thus described my invention, what I claim as new, and desire to secure by Letters Patent of the United States, is—

1. The combination of the reel having a head, a brake-bar attached at one end to a support, the other end being provided with a projection adapted to contact with the reel-head, a headed operating-screw passed through the wall of the case and attached therein in a swiveled manner by a nut, the inner end of the screw being screwed into the brake-bar, substantially as set forth.

2. The combination of a reel having the head, a brake-bar attached to a support at one end, the other end being provided with a projection adapted to contact with the reel-head, and an operating-screw passed through the wall of the case and attached therein in a swiveled manner, and adapted to operate by turning to carry the end of the brake-bar into and out of contact with the reel-head, substantially as set forth.

In testimony of the foregoing I have hereunto set my hand in the presence of two witnesses.

CHAS. H. F. KRAFT.

Witnesses:
ADELBERT A. WELCH,
LEON O. PERCY.